(12) United States Patent
Viessmann

(10) Patent No.: US 8,998,481 B2
(45) Date of Patent: Apr. 7, 2015

(54) DOUBLE SCREW EXTRUDER

(75) Inventor: Rainer Viessmann, Kulmbach (DE)

(73) Assignee: Hans Weber Maschinenfabrik GmbH, Kronach (DE)

( * ) Notice: Subject to any disclaimer, the term of this patent is extended or adjusted under 35 U.S.C. 154(b) by 258 days.

(21) Appl. No.: 13/587,203

(22) Filed: Aug. 16, 2012

(65) Prior Publication Data

US 2014/0050042 A1    Feb. 20, 2014

(51) Int. Cl.
*B29B 7/48* (2006.01)
*B29C 47/40* (2006.01)
*B29C 47/60* (2006.01)

(52) U.S. Cl.
CPC ........... *B29C 47/402* (2013.01); *B29C 47/6075* (2013.01); *B29B 7/489* (2013.01)

(58) Field of Classification Search
CPC ............ B29C 47/6075; B29C 47/6025; B29C 47/6043; B29C 47/6081
USPC .............. 366/83–85, 318, 323; 425/204, 208, 425/209
See application file for complete search history.

(56) References Cited

U.S. PATENT DOCUMENTS

| | | | |
|---|---|---|---|
| 3,006,029 A * | 10/1961 | Luther | 366/90 |
| 3,449,793 A | 6/1969 | Weir | |
| 3,461,497 A | 8/1969 | Geyer | |
| 5,318,357 A * | 6/1994 | Colby et al. | 366/81 |
| 5,975,449 A | 11/1999 | Geyer | |
| 6,048,088 A * | 4/2000 | Haring et al. | 366/85 |
| 2003/0112698 A1* | 6/2003 | Hauck et al. | 366/85 |
| 2003/0206482 A1* | 11/2003 | Griggs | 366/81 |
| 2004/0145964 A1* | 7/2004 | Kunz et al. | 366/97 |

FOREIGN PATENT DOCUMENTS

| | | |
|---|---|---|
| DE | 195 12 230 A1 | 12/1995 |
| JP | 56095662 A | 8/1981 |
| JP | 57207044 A | 12/1982 |
| JP | 60214921 A | 10/1985 |
| JP | 60234820 A | 11/1985 |
| JP | 11005215 A | 1/1999 |
| JP | 2000176995 A | 6/2000 |
| WO | 2008/075941 A1 | 6/2008 |

OTHER PUBLICATIONS

Office Action and European Search Report for Serial No. EP 12 17 1574 dated Sep. 19, 2012.
German Search Report for German Application U.S. Appl. No. 10 2011 051 101.6 dated Mar. 30, 2012.

* cited by examiner

*Primary Examiner* — Charles Cooley
*Assistant Examiner* — Marc C Howell
(74) *Attorney, Agent, or Firm* — McCormick, Paulding & Huber LLP

(57) ABSTRACT

What is described is a twin screw extruder having two extruder screws (10, 34), each extruder screw (10) having a cylindrical core (12) and at least one web (14) running helically over the periphery of the outer cylinder face of the core (12), the surface of the web (14) comprising a peripheral side (18) and two flanks (22, 24), and a channel (30) being formed between adjacent web windings. The flanks (22, 24) of the web (14) have a waved progression in the peripheral direction.

17 Claims, 2 Drawing Sheets

DOUBLE SCREW EXTRUDER

FIELD OF THE INVENTION

The invention relates to a twin screw extruder having extruder screws driven in opposite directions, each extruder screw having a core and at least one web running helically over the periphery of the outer face of the core, the web comprising a peripheral face and two flanks, and a channel being formed between adjacent web windings.

BACKGROUND

Twin screw extruders of this type are used for example in plastics processing. They can be designed with cylindrical or conical screws. Plastics granules or plastics powder, which may consist of a plurality of different components, is normally used as a starting material for the plastics processing.

The extruder screws perform the functions of transporting the plastic, plasticizing said plastic and mixing the individual components thoroughly to form a homogeneous material. The better the plasticization and mixing of the plastic with a predefined extruder screw length, the higher the quality of the products that can be manufactured.

SUMMARY

The object of the invention is to specify a twin screw extruder with which the plasticization and mixing of the plastic can be improved with equal length of the extruder screws.

This object is achieved in accordance with the invention by a twin screw extruder having two extruder screws of the type described in the introduction, in which the flanks of the web have the shape of a wave running in the peripheral direction and the width of the channel is constant.

The surface of each extruder screw is increased by the wave shape of the web flanks, and therefore the heat transfer into the plastic is improved, thus resulting in improved plasticization of the plastic. The wave shape of the flanks also allows the plastic material to move transverse to the direction of conveyance in the channel and thus forces a change in position of the material to be plasticized, which improves the mixing of the material. A greater homogenization of the plastic can be achieved by use of a twin screw extruder of this type.

Advantageous embodiments of the extruder screw according to the invention are disclosed in the dependent claims.

DESCRIPTION OF THE DRAWINGS

The invention will be explained hereinafter on the basis of an exemplary embodiment with reference to the figures, in which.

DETAILED DESCRIPTION

Figure 1:
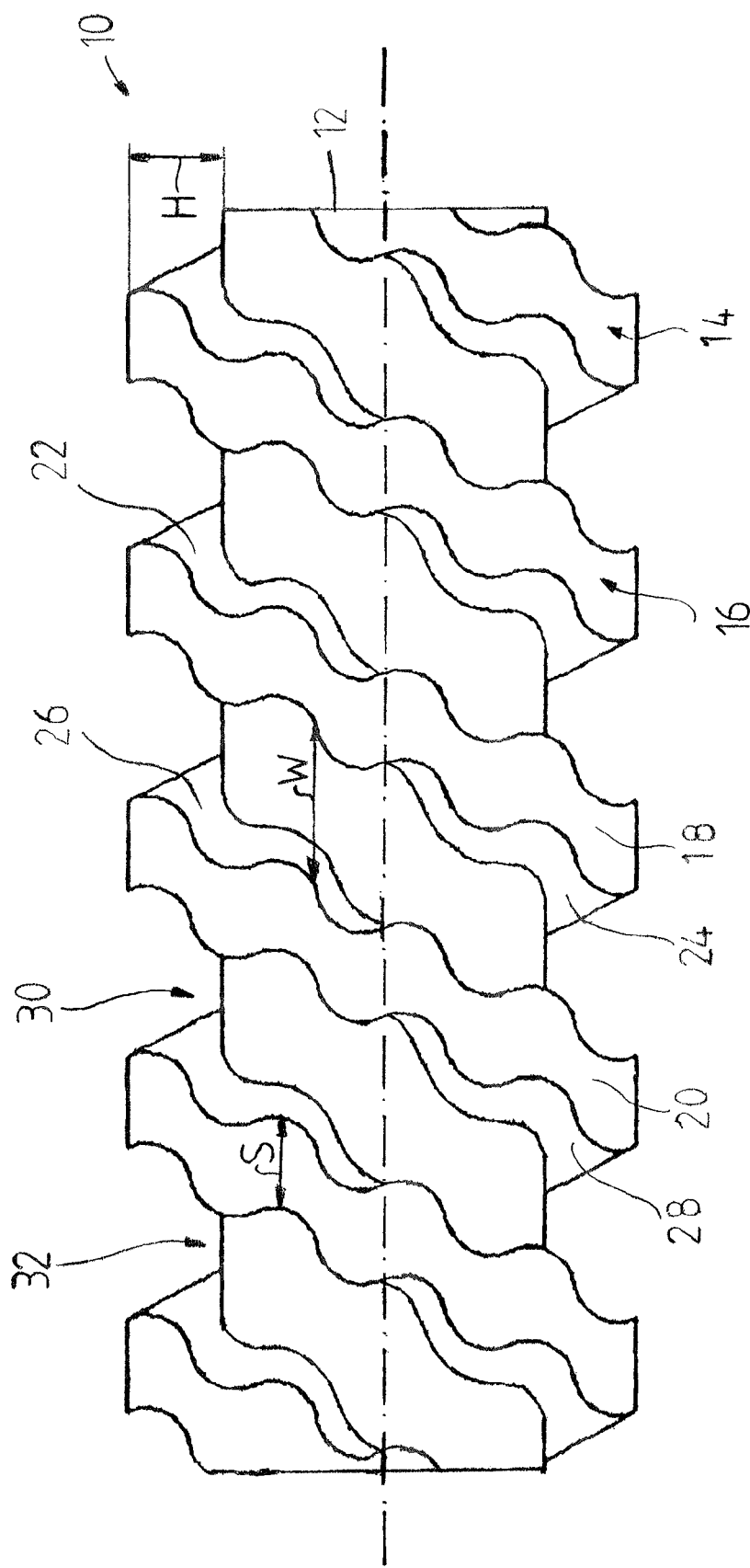
FIG. 1 shows a schematic illustration of a portion of an individual extruder screw of the twin screw extruder according to the invention.

FIG. 1 shows a portion of an individual extruder screw 10, which is illustrated in this case as a double-thread screw. In the present exemplary embodiment, two webs 14, 16, each with a web height H, run around a cylindrical core 12 of the extruder screw 10. The surface of each screw 14 and 16 is composed of a peripheral face 18 and 20 as well as two flanks 22, 24 and 26, 28 respectively. The flanks 22 to 28 of the webs 14, 16 are waved in the peripheral direction. The flanks 22 to 28 stand perpendicular on the outer cylinder face of the core 12.

The wave shape may be different. In the present exemplary embodiment, the amplitude of the wave is constant and the period length is selected in such a way that a revolution of each web 14, 16 about the cylindrical core 12 is an integral multiple of the period length of the wave. Furthermore, the width S of each web 14, 16 measured in the axial direction is constant over the entire progression of the web. The width W of the channels, denoted by 30, 32 in FIG. 1, measured in the axial direction also remains constant over the entire progression of the gap. The width of the channels 30, 32 is greater than the width of the webs 14, 16.

Figure 2:
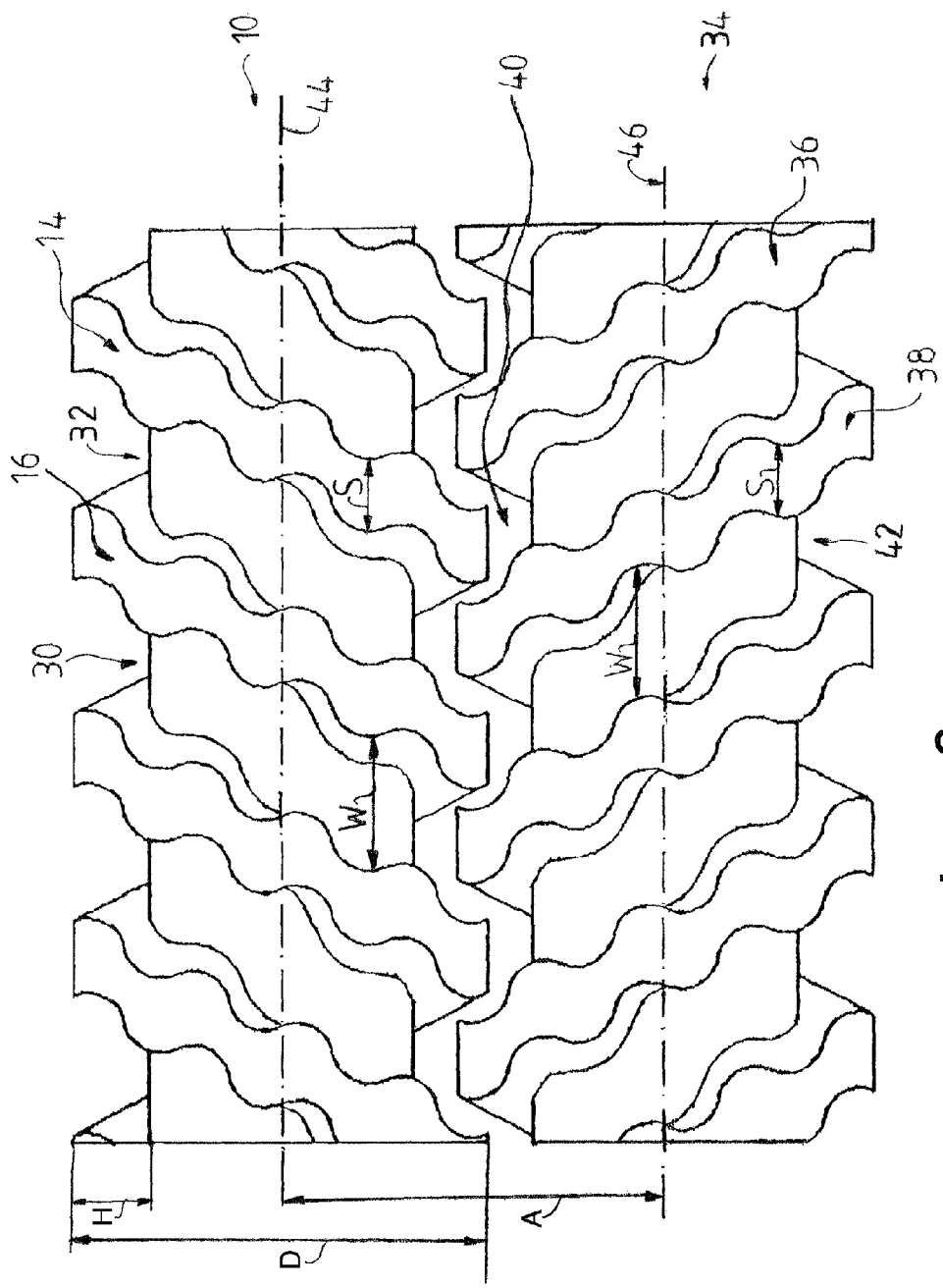
FIG. 2 shows an illustration corresponding to FIG. 1 of two intercombing extruder screws.

FIG. 2 shows a detail of two intercombing extruder screws 10, 34 according to the invention, wherein the extruder screw 10 is identical to the extruder screw 10 shown in FIG. 1. The extruder screws 10, 34 are installed in a twin screw extruder and are driven in opposite directions. The twin screw extruder is designed in a conventional manner for the rest and therefore is not illustrated in greater detail.

As illustrated in FIG. 2, the webs 14, 16 of the extruder screw 10 turn to the left. By contrast, the webs, denoted by 36, 38 in FIG. 2, of the extruder screw 34 corresponding to the webs 14, 16 of the extruder screw 10 turn to the right. The two extruder screws 10, 34 are otherwise of identical design. The extruder screw 34 therefore also has channels 40, 42, of which the width W is greater than the width S of the webs 36, 38.

The respective channel 30, 32 or 40, 42 is dimensioned such that the opposed web 36, 38 or 14, 16 of the respective other extruder screw 34, 10 can engage in this channel 30, 32 or 40, 42 when the distance A between the axes of rotation 44, 46 of the extruder screws 10, 34 is less than the diameter D of the respective extruder screws 10, 34.

The wave shape of the webs 14, 36, 38 means that the plastic is moved transversely within the channel 40 and therefore experiences a change in position. The individual components of the plastic are therefore better mixed and are plasticized more uniformly. In addition, the surface of the extruder screws 10, 34 is enlarged by the wave shape of the webs 14, 16, 36, 38, thus resulting in an improved heat transfer between the extruder screws 10, 34 and the plastic to be plasticized.

While the present invention has been illustrated and described with respect to a particular embodiment thereof, it should be appreciated by those of ordinary skill in the art that various modifications to this invention may be made without departing from the spirit and scope of the present.

What is claimed is:

1. A twin screw extruder having extruder screws driven in opposite directions, each extruder screw having a core and at least one web running helically over the periphery of the outer face of the core, the web comprising a peripheral face and two flanks, and a channel being formed between adjacent web windings, wherein the flanks of the web have the shape of a wave running in the peripheral direction, and in that the width (W) of the channel is constant.

2. The twin screw extruder as claimed in claim 1, wherein the wave shape of the flanks is periodical, at least in individual portions of each extruder screw.

3. The twin screw extruder as claimed in claim 1, wherein the period length and amplitude of the wave shape are constant, at least in individual portions of each extruder screw.

4. The twin screw extruder as claimed in claim 1, wherein the core is cylindrical.

5. The twin screw extruder as claimed in claim 1, wherein the web width (S) measured transverse to the flanks is constant.

6. The twin screw extruder as claimed in claim 1, wherein each extruder screw is formed with a double thread.

7. The twin screw extruder as claimed in claim 1, wherein in one extruder screw the web turns to the right and in the other extruder screw the web turns to the left, in that the width (W) of the channels is greater than the width (S) of the web, and in that the distance between the axes of rotation of the extruder screws is smaller than the diameter of the extruder screws, so that the web of an extruder screw engages in the channel of the respective other extruder screw.

8. The twin screw extruder as claimed in claim 2, wherein the period length and amplitude of the wave shape are constant, at least in individual portions of each extruder screw.

9. The twin screw extruder as claimed in claim 2, wherein the core is cylindrical.

10. The twin screw extruder as claimed in claim 3, wherein the core is cylindrical.

11. The twin screw extruder as claimed in claim 2, wherein the web width (S) measured transverse to the flanks is constant.

12. The twin screw extruder as claimed in claim 3, wherein the web width (S) measured transverse to the flanks is constant.

13. The twin screw extruder as claimed in claim 4, wherein the web width (S) measured transverse to the flanks is constant.

14. The twin screw extruder as claimed in claim 2, wherein each extruder screw is formed with a double thread.

15. The twin screw extruder as claimed in claim 3, wherein each extruder screw is formed with a double thread.

16. The twin screw extruder as claimed in claim 4, wherein each extruder screw is formed with a double thread.

17. A twin screw extruder comprising:
two extruder screws for extrusion of plastic material driven in opposite directions, each extruder screw having a core and at least one continuous screw shaped web running helically over the periphery of the outer face of the core, the continuous screw shaped web comprising a peripheral face and two flanks, and a channel being formed between adjacent web windings;
wherein the flanks of the continuous screw shaped web have the shape of a wave running in the peripheral direction;
wherein the waveform of the flanks permits movement of the plastic material transverse to a conveying direction of the channel, forcing a change in position of the plastic material to be plasticized for improved mixing of the plastic material; and
wherein the width (W) of the channel of each extruder screw is constant.

* * * * *